United States Patent
Mahadevan et al.

(10) Patent No.: US 8,452,867 B2
(45) Date of Patent: May 28, 2013

(54) SYSTEMS AND METHODS FOR NETWORK AND SERVER POWER MANAGEMENT

(75) Inventors: Priya Mahadevan, Sunnyvale, CA (US); Yoshio F. Turner, San Francisco, CA (US); Michael S. Schlansker, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 12/848,664

(22) Filed: Aug. 2, 2010

(65) Prior Publication Data
US 2012/0030345 A1 Feb. 2, 2012

(51) Int. Cl.
*G06F 15/173* (2006.01)

(52) U.S. Cl.
USPC .................. 709/224; 709/223; 713/320

(58) Field of Classification Search
USPC .................. 709/203, 223, 224; 713/320
See application file for complete search history.

(56) References Cited

U.S. PATENT DOCUMENTS

| 2004/0230848 | A1* | 11/2004 | Mayo et al. | 713/320 |
| 2010/0287390 | A1* | 11/2010 | Yu | 713/310 |
| 2012/0020373 | A1* | 1/2012 | Subramanian et al. | 370/419 |

OTHER PUBLICATIONS

M. Schlansker et al., Ensemble Routing for Datacenter Networks, Presented at ANCS, External Posting Date: Sep. 21, 2010, http://www.hpl.hp.com/techreports/2010/HPL-2010-120.pdf.

M. Al-Fares, et al., A Scalable, Commodity Data Center Architecture, Proceedings of SIGCOMM, Aug. 2008, http://cseweb.ucsd.edu/~vahdat/papers/sigcomm08.pdf., 12 pgs.

P. Mahadevan, et al., A Power Benchmarking Framework for Network Devices, Proceedings of IFIP Networking, May 2009, http://www.sysnet.ucsd.edu/~pmahadevan/publications/FinalVersion_Networking2009.pdf., 14 pgs.

P. Mahadevan, et al., Energy Aware Network Operations, IEEE Global Internet Symposium (in conjunction with IEEE Infocom), Apr. 2009, http://www.sysnet.ucsd.edu/~pmahadevan/publications/GI2009_paper.pdf, 6 pgs.

M. Schlanker et al., Killer Fabrics for Scalable Datacenters, Submitted to SIGCOMM, 2009, http://www.hpl.hp.com/techreports/2009/HPL-2009-26.html. 15 pgs.

* cited by examiner

*Primary Examiner* — El Hadji Sall (57) ABSTRACT

The present disclosure includes a system and method for managing network and server power. In an example of managing network and server power according to the present disclosure, routing network traffic is routed onto a number of core networks based on core network statistics, capacity requirements are determined based on core network statistics for the number of core networks and for a number of servers operating a number of virtual machines on the number of core networks, wherein the number of core networks include a number of core switches and a number of edge switches, and the capacity is set for the number of core switches based on the capacity requirements for the number of core networks and for the number of servers based on the capacity requirements for the number of servers.

12 Claims, 6 Drawing Sheets

SYSTEMS AND METHODS FOR NETWORK AND SERVER POWER MANAGEMENT

BACKGROUND

Energy efficiency is a concern in operating and managing computing services. Power consumption can affect the operational costs for the computing services and can contribute to the environmental impact of computing services. The power consumption of servers and switches in a network can be a significant contributor to the cost of operating a network. Some servers and switches can consume 70-80% of their peak power even when idle, thus wasting power and money.

Some networks can use inexpensive commodity switches connected together in a certain topology which can reduce the need to have high-bandwidth specialized root switches that are expensive and consume large amounts of power to operate. Some networks in certain configurations, such as a fat tree, for example, can use multiple switches that form a number of networks and/or a number of redundant paths for network traffic on the switches. The switches used in such network configurations can be commodity switches that use less power and are less expensive than root switches.

Some data centers that perform computing functions are designed for peak operation allowing the network to have the capability to operate at its maximum capacity at any time. In many data center networks, the average network utilization is much lower than peak, therefore networking equipment, such as servers and switches, are idle for long periods of time.

In some previous approaches, computing functions have been distributed across many servers in a network based on the type of computing function. Distributing network traffic based on the type of computing function created efficiencies in the network by apportioning network traffic so that the quantity of traffic remains balanced among the various servers and switches in the network.

DETAILED DESCRIPTION

The present disclosure includes a system and method for managing network and server power. A method for managing network and server power can include routing network traffic onto a number of core networks based on core network statistics, determining capacity requirements based on core network statistics for the number of core networks and for a number of servers operating a number of virtual machines on the number of core networks, wherein the number of core networks include a number of core switches and a number of edge switches, and setting the capacity for the number of core switches based on the capacity requirements for the number of core networks and for the number of servers based on the capacity requirements for the number of servers. In some examples of the present disclosure, network server power can be managed with a goal of reducing the overall IT infrastructure power consumption, while still being able to satisfy the network/server demands.

Examples of the present disclosure can also include configuring the number of core networks to handle the network traffic by reading network and topology statistics from a database, determining that core network capacity needs to be increased, and increasing the capacity of a link aggregation group (LAG) and/or activating a core switch to increase network capacity. LAGs can include a number of parallel links that are logically bundled together to increase the capacity of the uplinks.

Examples of the present disclosure can include configuring the number of core networks to handle the network traffic by reading network and topology statistics from a database, determining that core network capacity needs to be decreased, and decreasing the capacity of a LAG and/or deactivating a core switch to decrease network capacity.

Examples of the present disclosure can include configuring the number of servers to handle the allocated jobs by ranking the servers, gathering server usage statistics, allocating a number of virtual machines to a first number of servers, and deactivating a second number of servers, wherein a virtual machine was not allocated to the second number of servers. Also, examples of the present disclosure can include configuring a number of servers to handle the allocated jobs by ranking the servers, gathering server usage statistics, determining that the number of servers needed to operate the number of virtual machines needs to be increased, activating a number of servers, and allocating a number of virtual machines to the number of servers.

Activating and/or deactivating core switches, edge switches, and/or servers can manage the amount of power consumed by the switches and/or servers. Activating a switch and/or server can cause the switch and/or server to consume power and deactivating a switch and/or server can cause the switch and/or server to not consume power. Therefore, activating and/or deactivating the switches and/or servers can control the amount of power consumed by the switches and/or servers.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice this disclosure, and it is to be understood that other examples may be utilized and that process, electrical, and/or structural changes may be made without departing from the scope of the present disclosure. As used herein, the designators "N," "M," "P", "R", "S", "T", and "U", particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
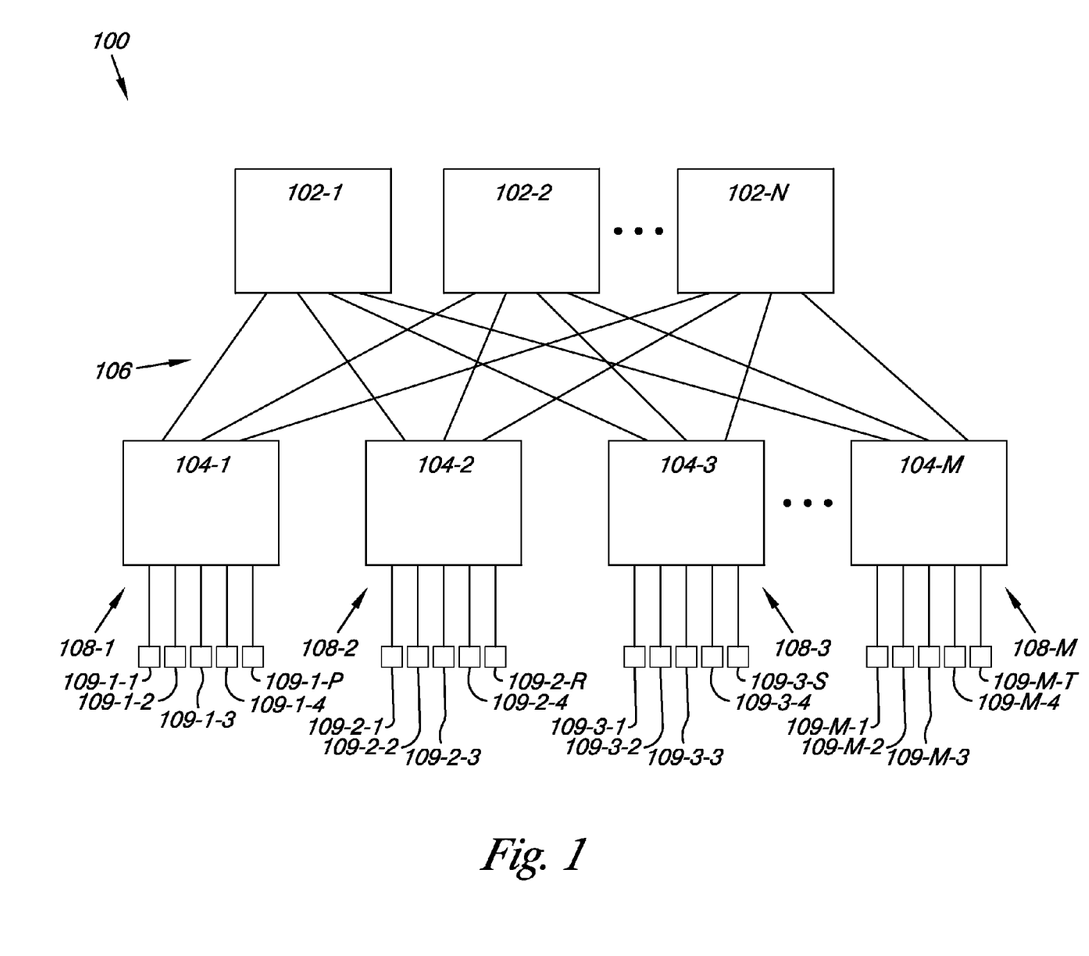
FIG. 1 illustrates a network architecture according to examples of the present disclosure.

FIG. 1 illustrates a network architecture according to examples of the present disclosure. In FIG. 1, network architecture 100 includes a number of core networks, wherein each core network includes a core switch 102-1, 102-2, and 102-N. Each of the core switches 102-1, 102-2, and 102-N for the number of networks can be coupled to a number of edge switches 104-1, 104-2, 104-3, and 104-M via a number of uplinks 106. The uplinks 106 can include a number of link aggregation groups (LAGs). LAGs can include a number of parallel links that are logically bundled together to increase the capacity of the uplinks.

Each of the edge switches 104-1, 104-2, 104-3, and 104-M can include a number of downlinks 108-1, 108-2, 108-3, and 108-M that can couple the edge switches 104-1, 104-2, 104-3, and 104-M to a number of servers.

Each edge switch can be coupled to a number of servers to create a number of edge networks, wherein each edge switch and the number of servers coupled to the edge switch form a portion of an edge network. In FIG. 1, a first edge network includes edge switch 104-1 and servers 109-1-1, 109-1-2, 109-1-3, 109-1-4, and 109-1-P, coupled to each other via downlinks 108-1. A second edge network includes edge switch 104-2 and servers 109-2-1, 109-2-2, 109-2-3, 109-2-4, and 109-2-R, coupled to each other via downlinks 108-2. A third edge network includes edge switch 104-3 and servers 109-3-1, 109-3-2, 109-3-3, 109-3-4, and 109-3-S, coupled to each other via downlinks 108-3. A fourth edge network includes edge switch 104-4 and servers 109-4-1, 109-4-2, 109-4-3, 109-4-4, and 109-4-T, coupled to each other via downlinks 108-M.

The uplinks between the core switches and the edge switches and the downlinks between the edge switches and the servers can be configured to create a number of redundant networks. For example, a core switch can be coupled to each of the edge switches via a number of uplinks, therefore each core switch can be part of a core network that includes each of the edge switches. Each edge switch can be part of each core network allowing the network traffic from each edge switch to be routed on any of the core networks. A core network can include a core switch coupled to each of the edge switches and the servers that are coupled to the edge switches.

Figure 2A:
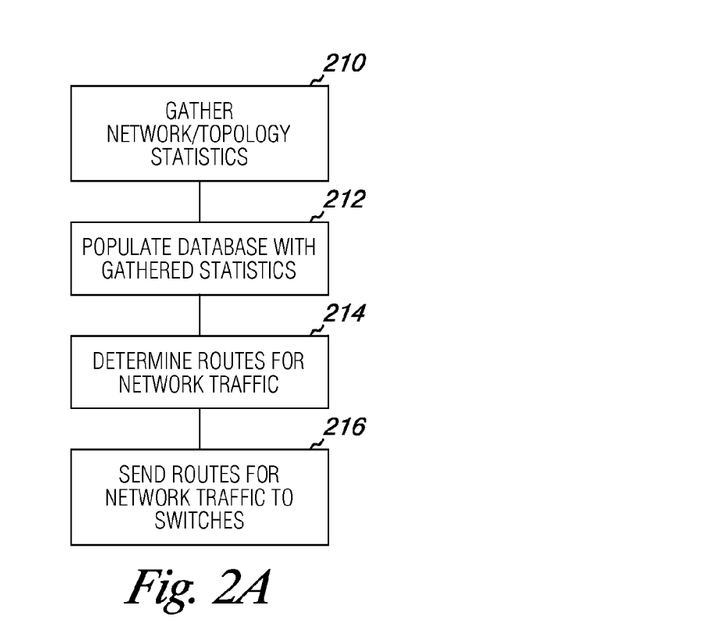
FIG. 2A is a block diagram illustrating routing network traffic onto a number of core networks according to examples of the present disclosure.

FIG. 2A is a method flow diagram illustrating routing network traffic onto a number of core networks according to examples of the present disclosure. In FIG. 2A, a traffic controller can route network traffic through a number of core networks that include core switches, edge switches, and servers. A traffic controller can include instructions stored a non-transitory computer readable medium executable by a processor to route network traffic through a number of core networks. A traffic controller can route network traffic by gathering network and topology statistics 210, populating a database with the gathered network and topology statistics 212, determining routes for the network traffic 214, and sending the routes for the network traffic to the switches on the network 216. In some examples, a traffic controller can cause the edge switches to route traffic through a number of core networks.

In some examples, the switch, link, and server utilization for a network can constantly be monitored. The statistics associated with the switch, link, and server utilization for a network can be written to a database. These statistics can be used to determine the routes for network traffic. The routes for network traffic can be based on the statistics to balance network traffic among the switches in the network. Once the routes for the network traffic are determined, the routing tables are published to the edge switches where the network traffic can be routed through the edge switches and core switches in the core network.

Figure 2B:
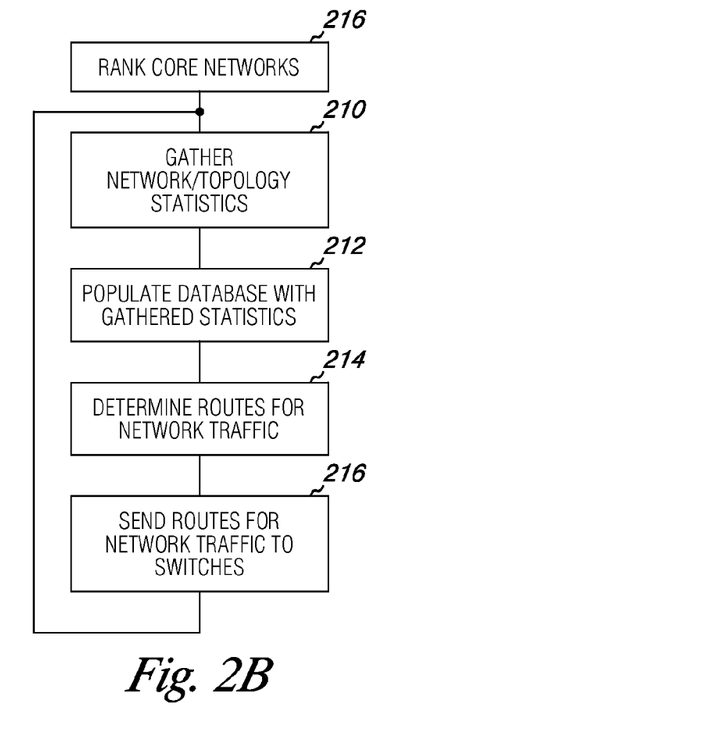
FIG. 2B is a block diagram illustrating routing network traffic onto a number of core networks according to examples of the present disclosure.

FIG. 2B is a method flow diagram illustrating routing network traffic onto a number of core networks according to examples of the present disclosure. In FIG. 2B, a traffic controller can route network traffic through a number of ranked core networks that include core switches and edge switches. A traffic controller can route network traffic by ranking the core networks 218, gathering network and topology statistics 210, populating a database with the gathered network and topology statistics 212, find routes for the network traffic 214, and send the routes for the network traffic to the switches on the network 216. In FIG. 2B, core networks are ranked and this ranking is used in conjunction with the core network power optimization discussed in association with FIG. 3 to determine which core switches to activate or deactivate. The core switches and the LAGs associated with the core switches can be ranked based on their ability to increase network traffic, which correlates to a lower rank, and their ability to consume less power, which correlates to a higher rank. Other rankings depending on the jobs, traffic statistics, network power consumption and network quality of service requirements are also possible.

Figure 3:
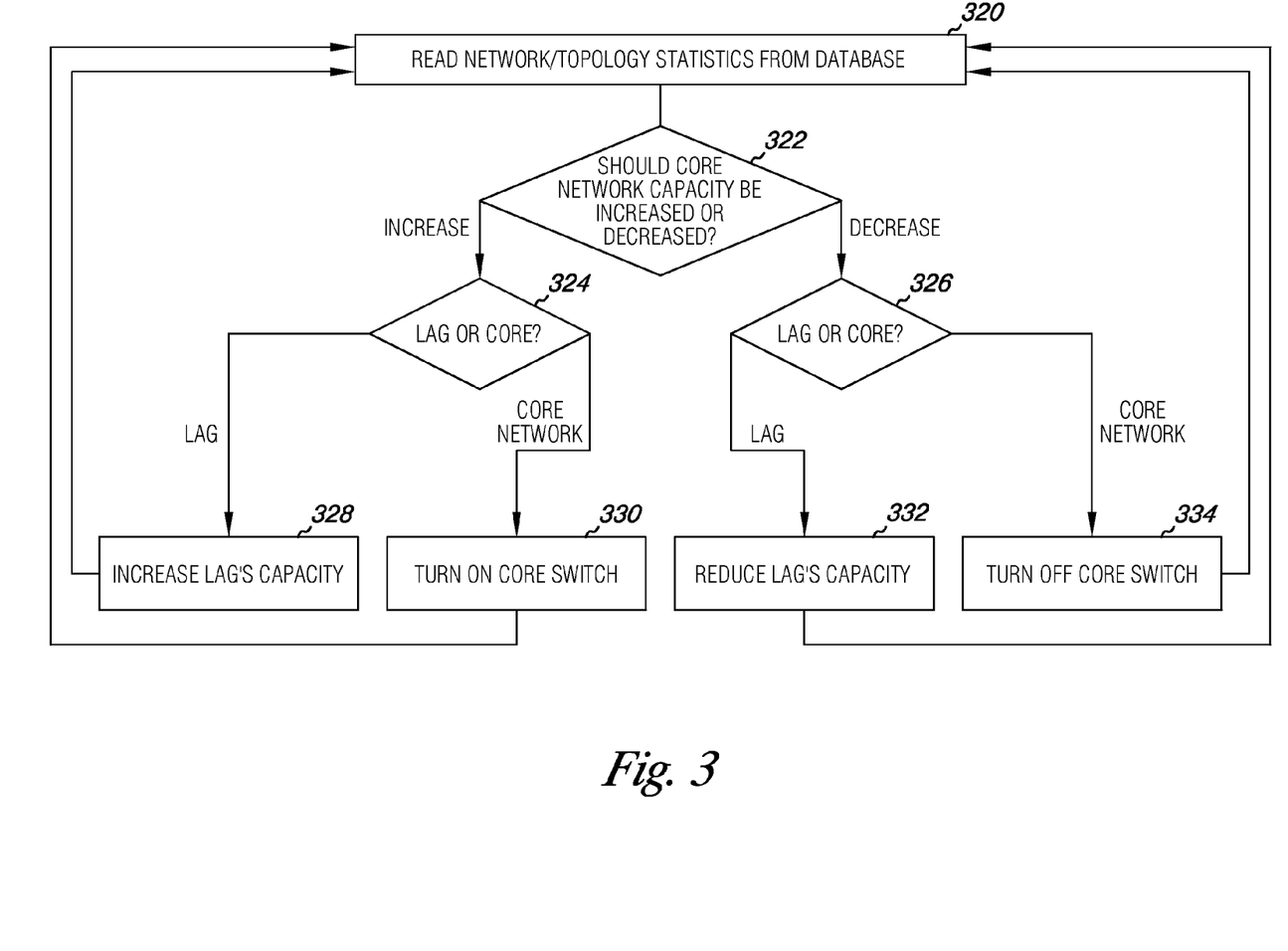
FIG. 3 is a block diagram illustrating configuring the number of core networks to handle the network traffic according to examples of the present disclosure.

FIG. 3 is a block diagram illustrating configuring the number of core networks to handle the network traffic according to examples of the present disclosure. In FIG. 3, a core network can be configured to operate with the number of core switches and LAGs to handle the network traffic. In FIG. 3, the network and topology statistics from the database are read 320 and based on the network and topology statistics a determination on whether network capacity needs to be increased or decreased is made 322. If network capacity needs to be increased, a determination is made whether LAG capacity can be increased or if core network capacity can be increased 324.

To increase LAG capacity, the LAG of an edge network that is currently operating at less than full capacity is increased to allow more traffic to travel trough that LAG 328. In some examples, the LAG that is most able to gain network traffic (e.g., lowest ranked) has their capacity increased. To increase core network capacity, a core switch is activated 330. In some examples, the core switch that is most able to gain network traffic (e.g. lowest ranked) is activated.

If network capacity needs to be decreased, a determination is made whether LAG capacity can be decreased or if core network capacity can be decreased 326. To decrease LAG capacity, the LAG of an edge network that is currently operating at less than full capacity is decreased to allow less traffic or no traffic to travel trough that LAG 332. In some examples, the LAG that is most able to reduce its network traffic (e.g., highest ranked) has its capacity increased. To decrease core network capacity, a core switch is deactivated 334. In some examples, the core switch that is most able to reduce network traffic (e.g. highest ranked) is deactivated. The network and topology statistics are continuously read to activate and/or deactivate LAGs and core switches to meet the traffic requirements of the core networks. In some examples, any number of LAGs and or switches can be activated and/or deactivated to handle the network traffic for the number of core networks.

Figure 4:
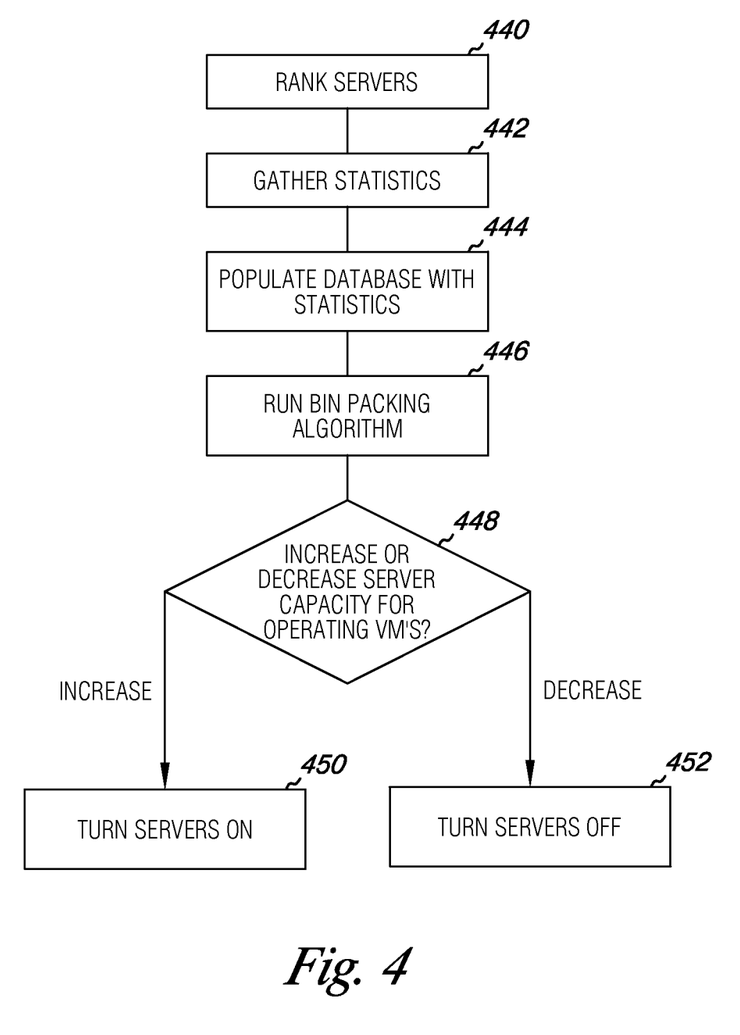
FIG. 4 is a block diagram illustrating configuring a number of servers to handle traffic according to examples of the present disclosure.

FIG. 4 is a method flow diagram illustrating configuring a number of servers that are operating to handle traffic according to examples of the present disclosure. In FIG. 4, a number of servers are configured to handle network traffic. The servers are configured by ranking the servers 440, gathering statistics on how the servers are used to operate a number of virtual machines 442, populating a database with the statistics on how the servers are used to operate a number of virtual machines (VMs) 444, running a bin packing algorithm 446, and determining whether to increase the number of servers used to host a number of virtual machines 448. In some examples, any number of algorithms can be used to determine how to assign virtual machines to the servers.

In some examples, the statistics gathered on how the servers are used to operate a number of virtual machines can include information for processor, memory, and other network elements. These statistics can be written to a database where the bin packing algorithm uses the statistics. The bin packing algorithm can rank servers based on their load, number of jobs being processed, and/or number of VMs hosted and then a number of virtual machines operating on the network can be allocated to a number of servers. The edge networks can be optimized by activating and/or deactivating servers based on the network traffic load for the virtual machines on the network. For example, if the number of virtual machines required to process all the allocated jobs can not be handled by the number of servers that are currently powered on, a number of others servers are powered on. And, for example, if the allocated jobs for a number of virtual machines are less that what can be handled by the number of servers that are currently powered on, a number of servers are powered off. The bin packing algorithm can also place the virtual machines on certain servers based on the statistics gathered regarding the servers operation.

In some examples, if the number of virtual machines required to process all the allocated jobs can not be handled by the number of servers that are currently powered on, a number of others servers are powered on and a number of edge switches that are coupled to the number of servers that are powered on are also powered on as needed. And, in some examples, if the allocated jobs for a number of virtual machines are less that what can be handled by the number of servers that are currently powered on, a number of servers are powered off and a number of edge switches that are coupled to the number of servers that are powered off are powered off if the edge switch is not coupled to a server that remains powered on.

Figure 5:
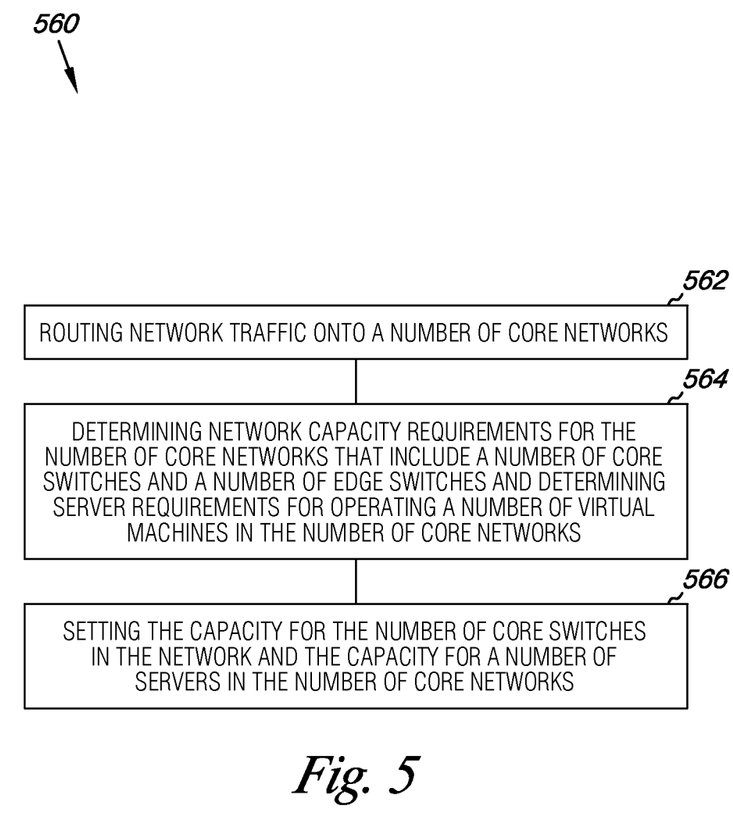
FIG. 5 is a method flow diagram illustrating managing network and server power according to examples of the present disclosure.

FIG. 5 is a method flow diagram illustrating managing network and server power according to examples of the present disclosure. In FIG. 5, managing network and server power 560 can include routing network traffic onto a number of core networks 562, determining network capacity requirements for the number of core networks that include a number of core switches and a number of edge switches and determining server capacity requirements for operating a number of virtual machines in the number of core networks 564, and setting the capacity for the number of core switches in the network and the capacity for a number of servers in the number of core networks 566.

A traffic controller can be used to route network traffic onto a number of core networks. The number of core networks can be configured to handle the network traffic by a core network optimizer. A core network optimizer can include instructions stored on a non-transitory computer readable medium executable by a processor to configure core switches to handle the network traffic. The core network optimizer can activate and/or deactivate core switches as needed to handle the network traffic. The core network optimizer can also activate and/or deactivate LAGs and/or portions of LAGs as needed to handle the network traffic. The number of servers can be configured to handle the network traffic by an edge network optimizer. An edge network optimizer can include instructions stored on a non-transitory computer readable medium executable by a processor to configure edge switches and servers to handle the network traffic. The edge network optimizer can allocate a number of servers to handle the traffic for a number of virtual machines and the edge network optimizer can activate and/or deactivate a number of servers as needed to handle network traffic of the number of virtual machines on the number of servers and the number of edge switches.

Figure 6:
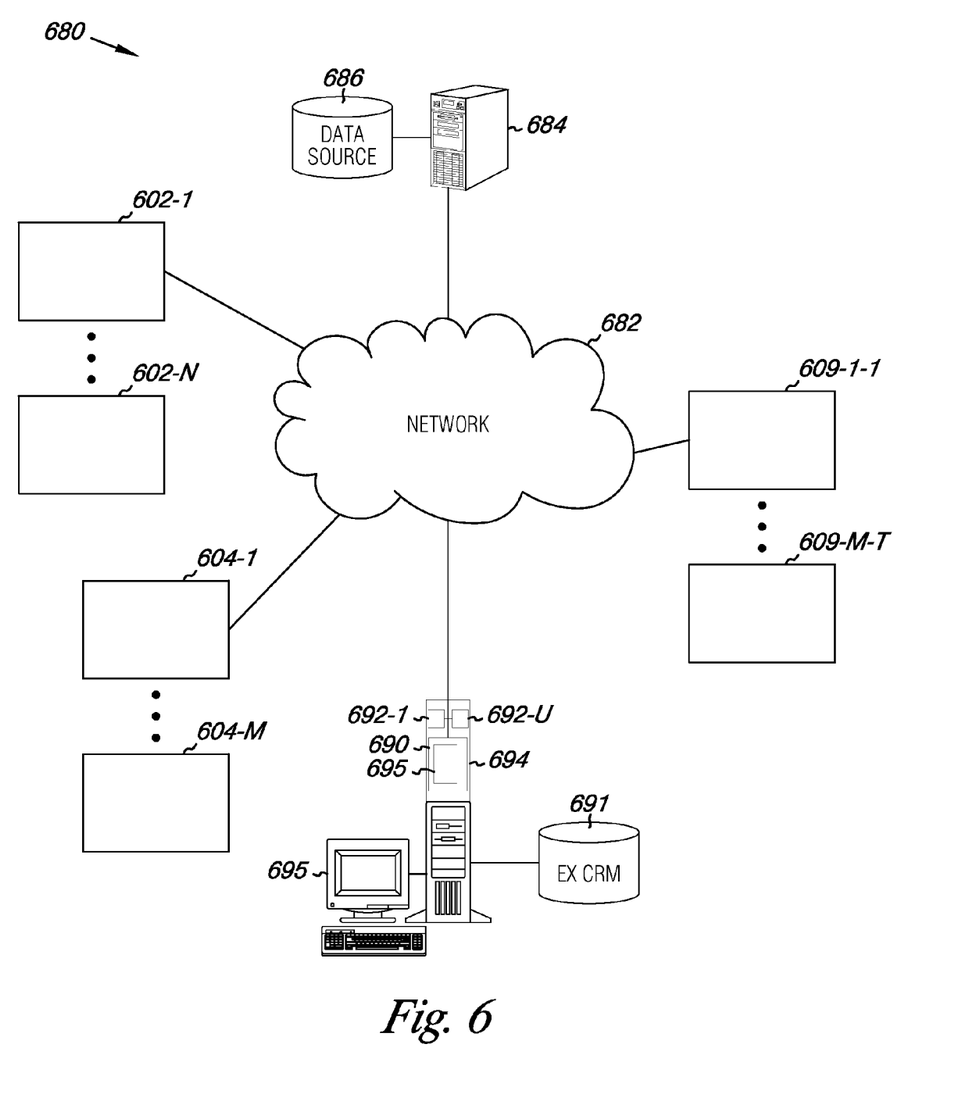
FIG. 6 is a diagram illustrating a computing system according to an example of the present disclosure.

FIG. 6 is a diagram illustrating a computing system according to an example of the present disclosure. The computing system 680 shown in FIG. 6 is a networked computing system. The network 682 can be a private network such as a local area network or wide area network, or can be a public network, such as the Internet. However, examples of the present disclosure are not limited to a particular computing system configuration.

The computing system 680 can be comprised of a number of computing resources communicatively coupled to the network 682. FIG. 6 shows computing devices 684 and 694. Computing device 684 has a data source 686. Computing devices 684 and 694 includes one or more processors. In FIG. 6, computing device 684 includes processors 692-1 and 692-U communicatively coupled to a non-transitory computer-readable medium 690. The non-transitory computer-readable medium 690 is structured to store one or more programs 695 that are executed by the one or more processors 692-1 and 692-U and/or data.

Computing device 694 is further communicatively coupled to a production device 695 (e.g., electronic display, printer, etc.). Computing device 694 can also be communicatively coupled to an external computer-readable memory 691. The computing device 694 can cause an output to the production device 695, for example, as a result of executing instructions of one or more programs stored non-transitory computer-readable medium 690, by at least one processor 692-1 and 692-U, to implement a method of automatic page layout according to the present disclosure. Causing an output can include, but is not limited to, displaying text and images to an electronic display and/or printing text and images to a tangible medium (e.g., paper). For example, a plurality of text articles and images, with or without captions, can be arranged to appear in an arrangement similar to a newspaper or magazine and caused to be output to a computer monitor or printed to a tangible medium.

Computing devices 684 and 694 can be communicatively coupled to one another through the network 682 and to a number of core switches 602-1 . . . 602-N, a number of edge switches 604-1 . . . 604-M, and a number of servers 609-1-1 . . . 609-M-T. Computing system 680 includes a number of core networks, wherein each core network includes a core switch 102-1 . . . 102-N. Each of the core switches 102-1 . . . 102-N for the number of core networks can be coupled to a number of edge switches 104-1 . . . 104-M via a number of uplinks. The uplinks can include a number of link aggregation groups (LAGs).

Each of the edge switches 104-1 . . . 104-M can include a number of downlinks that can couple the edge switches 104-1 . . . 104-M to a number of servers 109-1-1 . . . 109-M-T.

Each edge switch can be coupled to a number of servers to create a number of edge networks, wherein each edge switch and the number of servers coupled to the edge switch form a portion of an edge network.

The computing system 680 can be comprised of multiple interconnected computing resources, such as servers 609-1-1 ... 609-M-T, core switches 602-1 ... 602-N, edge switches 604-1 ... 604-M, and computing devices 684 and 694. A computing resource (e.g., 624, 628) can include control circuitry such as a processor, a state machine, application specific integrated circuit (ASIC), controller, and/or similar machine. As used herein, the indefinite articles "a" and/or "an" can indicate one or more than one of the named object. Thus, for example, "a processor" can include one processor or more than one processor, such as a parallel processing arrangement.

The control circuitry can have a structure that provides a given functionality, and/or execute computer-readable instructions that are stored on a non-transitory computer-readable medium (e.g., 686, 690). The non-transitory computer-readable medium 690 can be integral, or communicatively coupled, to a computing resource such as computing device 694, in either in a wired or wireless manner. For example, the non-transitory computer-readable medium 690 can be an internal memory, a portable memory, a portable disk, or a memory located internal to another computing resource (e.g., enabling the computer-readable instructions to be downloaded over the Internet). The non-transitory computer-readable medium 690 can have computer-readable instructions stored thereon that are executed by the control circuitry (e.g., processor) to provide a particular functionality.

The non-transitory computer-readable medium 690, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), among others. The non-transitory computer-readable medium 630 can include optical discs, digital video discs (DVD), high definition digital versatile discs (HD DVD), compact discs (CD), laser discs, and magnetic media such as tape drives, floppy discs, and hard drives, solid state media such as flash memory, EEPROM, phase change random access memory (PCRAM), as well as other types of machine-readable media.

In FIG. 6, a traffic controller can include instructions stored a non-transitory computer readable medium 690 executable by a processor 692-1 on computing device 694 to route network traffic through a number of core networks by communicating the routing instructions to the edge switches 604-1 ... 604-M. A traffic controller can route network traffic by gathering network and topology statistics, populating a database with the gathered network and topology statistics, find routes for the network traffic, and send the routes for the network traffic to the switches on the network. In some examples, a traffic controller can cause the edge switches to route traffic through a number of core networks.

In some examples, a core network optimizer can include instructions stored a non-transitory computer readable medium 690 executable by a processor 692-1 on computing device 694 to configure core switches to handle the network traffic. The core network optimizer can activate and/or deactivate core switches as needed to handle the network traffic. The core network optimizer can also activate and/or deactivate LAGs and/or portions of LAGs as needed to handle the network traffic. The number of servers can be configured to handle the network traffic by an edge network optimizer. An edge network optimizer can include instructions stored a non-transitory computer readable medium 690 executable by a processor 692-1 on computing device 694 to configure edge switches and servers to handle the network traffic. The edge network optimizer can allocate a number of servers to handle the traffic for a number of virtual machines and the edge network optimizer can activate and/or deactivate a number of servers as needed to handle network traffic of the number of virtual machines on the number of servers and the number of edge switches.

The above specification, examples and data provide a description of the method and applications, and use of the system and method of the present disclosure. Since many examples can be made without departing from the spirit and scope of the system and method of the present disclosure, this specification merely sets forth some of the many possible configurations and implementations.

Although specific examples have been illustrated and described herein, those of ordinary skill in the art will appreciate that an arrangement calculated to achieve the same results can be substituted for the specific examples shown. This disclosure is intended to cover adaptations or variations of a number of examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the number of examples of the present disclosure includes other applications in which the above structures and methods are used. Therefore, the scope of number of examples of the present disclosure should be determined with reference to the appended claims, along with the full range of equivalents to which such claims are entitled.

Various examples of the system and method for apportioning power consumption have been described in detail with reference to the drawings, where like reference numerals represent like parts and assemblies throughout the several views. Reference to various examples does not limit the scope of the system and method for displaying advertisements, which is limited only by the scope of the claims attached hereto. Additionally, any examples set forth in this specification are not intended to be limiting and merely set forth some of the many possible examples for the claimed system and method for apportioning power consumption.

Throughout the specification and claims, the meanings identified below do not necessarily limit the terms, but merely provide illustrative examples for the terms. The meaning of "a," "an," and "the" includes plural reference, and the meaning of "in" includes "in" and "on." The phrase "in an example," as used herein does not necessarily refer to the same example, although it may.

In the foregoing Detailed Description, some features are grouped together in a single example for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

What is claimed:

1. A method for managing network and server power, the method comprising:
routing network traffic onto a number of core networks based on core network statistics;
determining capacity requirements for the number of core networks based on core network statistics for the number of core networks and for a number of servers operating a number of virtual machines on the number of core networks, wherein the number of core networks include a number of core switches and a number of edge switches;

ranking the number of core switches based on their ability to increase network traffic and consume less power;

setting the capacity for the number of core switches based on the capacity requirements for the number of core networks and the rank of the core switches and for the number of servers based on the capacity requirements for the number of servers; and setting the capacity of the number of core networks by reading core network statistics from a database, determining that the capacity of the number of core networks needs to increase or decrease to meet core network capacity requirements, and changing the capacity of a Link Aggregation Group (LAG) to increase or decrease the capacity of the number of core networks.

2. The method of claim 1, wherein the method includes activating a number of core switches to meet the capacity requirements for the number of core networks.

3. The method of claim 1, wherein the method includes deactivating a number of core switches to meet the capacity requirements for the number of core networks.

4. The method of claim 1, wherein the method includes activating a number of servers to meet the capacity requirements for the number of servers when the capacity requirements to operate the number of virtual machines are to be increased and wherein the method includes allocating the number of virtual machines to the number of servers that are activated.

5. The method of claim 1, wherein the method includes deactivating a number of servers to meet the capacity requirements for the number of servers when the capacity requirements to operate the number of virtual machines are to be decreased and wherein the method includes allocating the number of virtual machines to a number of servers that are not deactivated.

6. A non-transitory computer readable medium having instructions stored thereon executable by a processor to:

route network traffic onto a number of core networks based on core network statistics;

determine capacity requirements for the number of core networks based on core network statistics for the number of core networks and for a number of servers operating a number of virtual machines on the number of core networks, wherein the number of core networks includes a number of core switches and a number of edge switches;

rank the number of core switches based on their ability to increase network traffic and consume less power;

set the capacity for the number of core switches based on the capacity requirements for the number of core networks and the rank of the core switches and for the number of servers based on the capacity requirements for the number of servers; and set the capacity of the number of core networks by reading core network statistics from a database, determining that the capacity of the number of core networks needs to increase or decrease to meet core network capacity requirements, and changing the capacity of a Link Aggregation Group (LAG) to increase or decrease the capacity of the number of core networks.

7. The non-transitory computer readable medium of claim 6, wherein the number of core switches route network traffic on the number of core networks, wherein the number of core networks include a number of core switches and a number of edge switches.

8. The non-transitory computer readable medium of claim 6, wherein the capacity of the number of core networks is configured to handle the network traffic by reading network statistics from a database, determining that the capacity of the number of core networks needs to be increased, and activating a core switch to increase the capacity of the number of core networks.

9. The non-transitory computer readable medium of claim 6, wherein the capacity of the number of core networks is configured to handle the network traffic by reading network statistics from a database, determining that the capacity of the number of core networks needs to be decreased, and deactivating a core switch to decrease the capacity of the number of core networks.

10. The non-transitory computer readable medium of claim 6, wherein the number of servers are configured to handle a number of jobs allocated to the number of servers by ranking the number of servers, gathering server usage statistics, allocating a number of virtual machines to a first number of servers, and deactivating a second number of servers, wherein a virtual machine was not allocated to the second number of servers.

11. The non-transitory computer readable medium of claim 6, wherein the number of servers are configured to handle a number of jobs allocated to the number of servers by ranking the number of servers, gathering server usage statistics, determining that the number of servers needed to operate the number of virtual machines needs to be increased, activating a number of servers, and allocating a number of virtual machines to the number of servers.

12. A network and server power management system, comprising:

at least one computing device communicatively coupled to a number of edge switches, a number of core switches, and a number of servers, and having:

at least one processor;

a non-transitory memory in communication with the at least one processor, the non-transitory memory being programmed with instructions executable on at least one processor to:

route network traffic onto a number of core networks based on core network statistics;

determine capacity requirements for the number of core networks based on core network statistics for the number of core networks and for a number of servers operating a number of virtual machines on the number of core networks, wherein the number of core networks includes a number of core switches and a number of edge switches;

rank the number of core switches based on their ability to increase network traffic and consume less power;

set the capacity for the number of core switches based on the capacity requirements for the number of core networks and the rank of the core switches and for the number of servers based on the capacity requirements for the number of servers; and set the capacity of the number of core networks by reading core network statistics from a database, determining that the capacity of the number of core networks needs to increase or decrease to meet core network capacity requirements, and changing the capacity of a Link Aggregation Group (LAG) to increase or decrease the capacity of the number of core networks.

* * * * *